(12) United States Patent
Oller

(10) Patent No.: US 11,172,667 B2
(45) Date of Patent: Nov. 16, 2021

(54) DEVICE FOR DETECTING INSECTS

(71) Applicant: Anticimex Innovation Center A/S, Denmark (DK)

(72) Inventor: Jordi Tapias Oller, Barcelona (ES)

(73) Assignee: ANTICIMEX INNOVATION CENTER A/S, Helsinge (DK)

( * ) Notice: Subject to any disclaimer, the term of this patent is extended or adjusted under 35 U.S.C. 154(b) by 434 days.

(21) Appl. No.: 16/308,762

(22) PCT Filed: Jun. 8, 2017

(86) PCT No.: PCT/ES2017/070417
§ 371 (c)(1),
(2) Date: Dec. 10, 2018

(87) PCT Pub. No.: WO2017/216406
PCT Pub. Date: Dec. 21, 2017

(65) Prior Publication Data
US 2019/0159439 A1    May 30, 2019

(30) Foreign Application Priority Data

Jun. 13, 2016   (ES) ................ ES201630802

(51) Int. Cl.
A01M 1/02   (2006.01)

(52) U.S. Cl.
CPC ............ *A01M 1/026* (2013.01); *A01M 1/023* (2013.01)

(58) Field of Classification Search
CPC .............................. A01M 1/026; A01M 1/023
USPC ........................................................ 43/121
See application file for complete search history.

(56) References Cited

U.S. PATENT DOCUMENTS

| | | | |
|---|---|---|---|
| 5,595,018 A | 1/1997 | Wilbanks | |
| 6,032,406 A | 3/2000 | Howse et al. | |
| 6,150,944 A | 11/2000 | Martin et al. | |
| 6,305,122 B1 * | 10/2001 | Iwao ................ | A01M 1/145 43/112 |
| 6,568,124 B1 * | 5/2003 | Wilbanks ........... | A01M 1/023 43/112 |
| 7,441,368 B1 * | 10/2008 | Rieger ............... | A01M 1/026 43/139 |
| 10,524,461 B1 * | 1/2020 | Files ................. | G06F 9/542 |
| 2016/0235050 A1 * | 8/2016 | Janet ................. | A01M 1/14 |

(Continued)

FOREIGN PATENT DOCUMENTS

ES    2 137 009 T3    12/1999
ES    2 571 535 T3    5/2016

(Continued)

OTHER PUBLICATIONS

International Preliminary Search Report dated Oct. 17, 2018 for PCT/ES2017/070417.

*Primary Examiner* — Christopher P Ellis
(74) *Attorney, Agent, or Firm* — Crowell & Moring LLP; John C. Freeman

(57) ABSTRACT

Device for detecting insects comprising as main elements an inner chamber that has a temperature higher than the temperature outside and a passive infrared sensor that emits an alarm signal when it detects a change in temperature in the inner chamber due to the presence of any animal, for example, an insect; which is very useful for the monitoring of insects in a determined area and the subsequent actuation for the eradication thereof.

6 Claims, 1 Drawing Sheet

(56) References Cited

U.S. PATENT DOCUMENTS

| | | | | |
|---|---|---|---|---|
| 2016/0238737 | A1* | 8/2016 | Janet | G01N 35/00 |
| 2017/0273290 | A1* | 9/2017 | Jay | G06K 9/00771 |
| 2018/0027795 | A1* | 2/2018 | Janet | A01M 1/04 |
| 2018/0199565 | A1* | 7/2018 | Zosimadis | A01M 23/18 |
| 2019/0261775 | A1* | 8/2019 | Sarimaa | A01M 1/04 |
| 2020/0367483 | A1* | 11/2020 | Geier | A01M 1/06 |
| 2020/0404897 | A1* | 12/2020 | Lillamand | G01N 15/10 |
| 2021/0029983 | A1* | 2/2021 | Deering | A01M 31/002 |

FOREIGN PATENT DOCUMENTS

| | | |
|---|---|---|
| WO | WO 87/00727 A1 | 2/1987 |
| WO | WO 01/06474 A1 | 1/2001 |
| WO | WO 2012/104598 A1 | 8/2012 |
| WO | WO 2015/185063 A1 | 12/2015 |
| WO | WO 2016/130182 A1 | 8/2016 |
| WO | WO 2017/216406 A2 | 12/2017 |

\* cited by examiner

DEVICE FOR DETECTING INSECTS

RELATED APPLICATIONS

This application claims the benefit under 35 U.S.C. § 371 of the filing date of International Patent Application No. PCT/ES2017/070417, having an international filing date of Jun. 8, 2017, which claims priority to Spanish Application No. ES P201630802, filed Jun. 13, 2016, the contents of both of which are incorporated herein by reference in their entirety.

OBJECT OF THE INVENTION

The present invention, according to how it is described in the title of the present specification, relates to a device for detecting insects. Said device comprises as main elements an inner chamber that has a temperature higher than the temperature outside and a passive infrared sensor that emits an alarm signal when it detects a change in temperature in the inner chamber due to the presence of any animal, for example, an insect; which is very useful for the monitoring of insects in a determined area and the subsequent actuation for the eradication thereof.

BACKGROUND OF THE INVENTION

The presence of insects that are pests entail an important health risk, bringing with them considerable economic losses. Likewise, they are considered an annoyance for people, in community as well as industrial and agricultural settings.

Presently, the infrared detection systems are used for detecting organisms able to regulate their temperature, regardless of the temperature of their surroundings, given that these detection systems can only detect whether there are temperature differences (IR emission) with respect to the temperature of the sensor itself and the surroundings thereof.

Regarding the devices for detecting and/or eradicating insects, these are widely known in the current state of the art, and various alternatives have been developed, the majority of them being based on trap mechanisms, for the capture and elimination of the insect. The most commonly used traps are electrical traps that use a light source to attract the insects, those that are attracted by light rest on a metal grate connected to a high electric potential and are electrocuted; other traps are adhesive retention ones.

An example of a trapping system for insects is disclosed in the document ES2137009, which describes a device that uses an ion wind to facilitate the dispersion of a source of attraction for insects, and which uses electrocution as the elimination method thereof.

Moreover, the document ES2571535 discloses a device comprising a radiation source that emits a suitable wavelength for attracting insects to the device, and an amount of adhesive material arranged on a capturing surface. The insects that are attracted towards the device by the radiation can run into the adhesive material and be trapped by the device.

The patent application WO8700727 discloses a method for eliminating insects, which includes the steps of attracting the insect; generating an infrared beam; directing the infrared beam along a corridor between a pair of electrodes; detecting the presence of an insect in the corridor between the pair of electrodes; applying high voltage to the electrodes in response to the detection of the insect; executing the insect by means of applying high voltage to the electrodes; and eliminating the electrocuted insect.

Considering the aforementioned, it is useful to note that the detection is of vital importance as a preventative action in order to prevent the appearance of pests, since once the animals are detected effective elimination mechanisms can be applied, not only in the area where they have been detected, but also in a determined area near where the detection was carried out; this being an advantage over the conventional elimination means, since in the conventional means, those animals that have not come into contact with said elimination devices can develop without control means being taken to prevent it.

The present invention resolves the previously mentioned problems of the state of the art, as it provides a device for detecting insects, which uses an infrared sensor that emits an alarm signal upon detecting a temperature change.

DESCRIPTION OF THE INVENTION

The object of the present invention is to provide a device for detecting insects combining the use of a passive infrared sensor (PIR) and an inner chamber that has a temperature (Ti) higher than the outside temperature (Te) of the place where it is arranged. The passive infrared sensor emits an alarm signal when it detects a change in the emission of infrared radiation in the inner chamber due to the presence of any animal, for example, an insect; and for this reason the device is very useful for monitoring and elimination insects, preventing the appearance of pests.

It is important to take into account that the passive infrared sensors (PIR) do not create or irradiate energy with the goal of detecting, but rather they work in their entirety to detect the energy emitted by other objects, in the form of infrared radiation (IR emission), for which reason these PIR sensors do not detect or measure "heat", but they detect the infrared radiation emitted by an object, which is associated with the temperature thereof.

In the present invention it will be understood that when the passive infrared sensor detects a temperature or a temperature change, it will be detecting an infrared radiation emission or a change in infrared radiation, respectively.

It is well known that insects have the same temperature as the environment that surrounds them, and this makes them undetectable by passive infrared sensors alone, given that these detection systems can only detect if there are temperature variations, in the form of infrared radiation (IR emission) in the surroundings where they are located.

Therefore, an object of the present invention is a device for detecting insects characterized in that it comprises an inner chamber provided with an opening for the entrance of insects, an inner heating base that has an electrical resistance for supplying heat and maintaining a temperature Ti in said inner chamber, Ti being greater than the temperature outside Te of the place where the device is located (Ti>Te), and where Ti is suitable for attracting insects, and a passive infrared sensor enabled to detect infrared radiation that emits an alarm signal when it detects a change in infrared radiation in the inner chamber due to the presence of any animal, for example an insect.

The device can be functionally associated to an alarm receiver, by means of the alarm signal.

The device of the present invention, upon detecting a change in infrared radiation in the inner chamber due to the presence of an animal, for example, an insect that has entered into said inner chamber, with a body temperature different than that found inside, emits an alarm signal, which will be picked up and processed by an alarm receiver, hence both elements are functionally associated.

The inner chamber of the device is set at a temperature Ti from 20° C. to 40° C. A preferred working temperature of the inner chamber is 35° C. This temperature Ti of the inner chamber is an attractive temperature for the insect, for which reason it is used as a main source for attracting the insect. Additionally, the attraction of the insect can also be accompanied by any other means of attraction, which could be food, pheromones, ultraviolet light, among others.

The inner heating base is in said inner chamber, maintaining the temperature of the inner chamber by means of an electrical resistance, which provides the heat required in the inner chamber. Additionally, and in order to guarantee suitable operation of the device, the inner heating base can be provided with a thermostat, as a temperature regulating element. The inner heating base, through the electrical resistance, is connected to an energy source.

The device for detecting insects of the present invention will be able to be part of a system for detecting insects. Said system will be able to be made up of at least:
  a device for detecting insects according to the present invention, comprising an inner chamber provided with an opening for the entrance of insects, an inner heating base enabled to maintain a temperature Ti in said inner chamber by means of an electrical resistance and a passive infrared sensor that emits an alarm signal when it detects a change in infrared radiation in the inner chamber,
  an alarm receiving element that detects the alarm signal emitted by the passive infrared sensor, and
  a warning signal emitting element.

Depending on the desired area to be controlled or monitored for the presence of insects, the system will be made up of a plurality of devices for detecting insects, receiving elements and warning signal emitting elements.

Other characteristics and advantages of the device for detecting insects, object of the present invention, will become clear in light of the description of a preferred, though non-limiting, embodiment, which, by way of an example, is illustrated in the accompanying drawings that are described below.

DESCRIPTION OF THE DRAWINGS

With the aim of complementing the above description, and gaining a better understanding of the characteristics of the present invention, a set of drawings listed below constituting an integral part thereof is attached to this specification.

PREFERRED EMBODIMENT OF THE INVENTION

Figure 1:
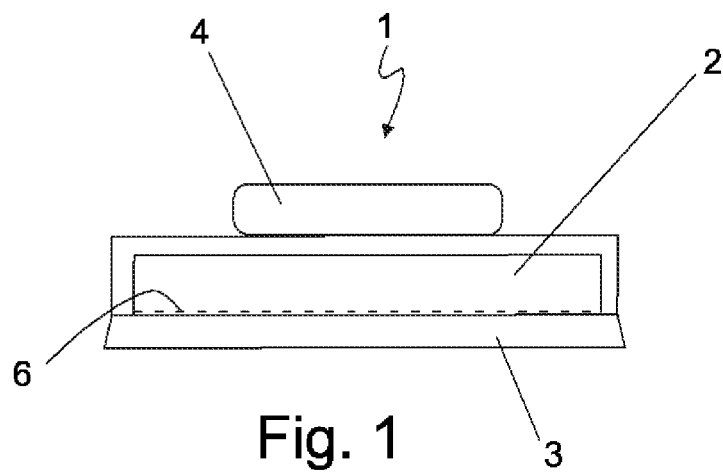
FIG. 1 represents a schematic view of the device for detecting insects according to the present invention.
Figure 2:
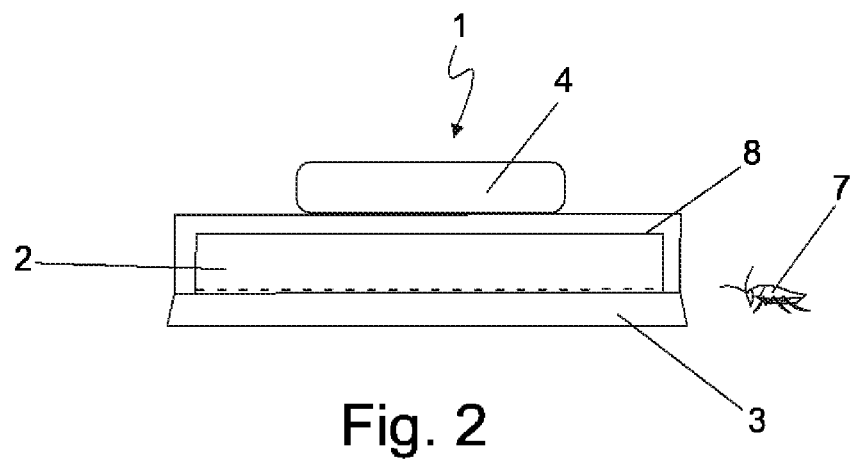
FIG. 2 represents a schematic view of the device for detecting insects of the present invention during a first step of the use thereof.
Figure 3:
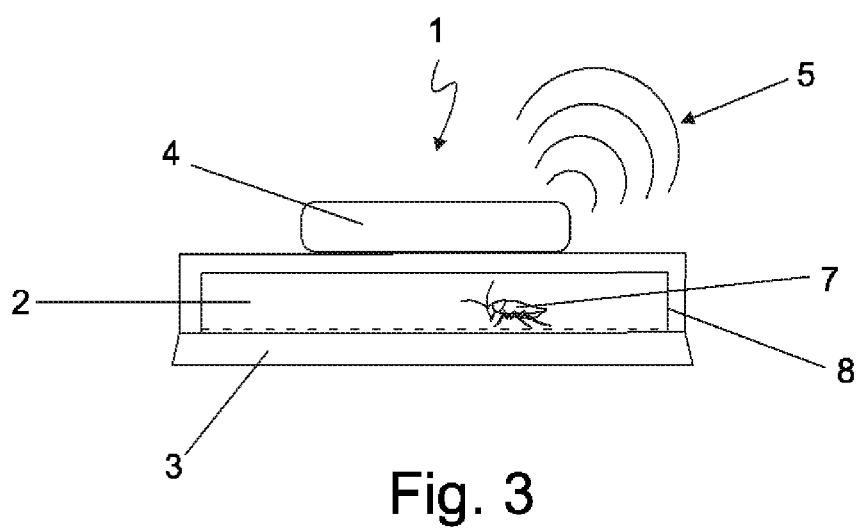
FIG. 3 represents a schematic view of the device for detecting insects of the present invention during a second step of the use thereof.

As seen in FIG. 1, in an embodiment of the present invention, a device (1) is disclosed for detecting insects comprising an inner chamber (2) provided with an opening (8) for the entrance of insects, an inner heating base (3) that has an electrical resistance (6) for supplying heat and maintaining a temperature Ti in said inner chamber (2) and a passive infrared sensor (4) enabled to detect infrared radiation and that emits an alarm signal (5) when it detects a change in infrared radiation in the inner chamber (2).

The device (1) can be functionally associated to an alarm receiver (not shown), by means of the alarm signal (5). This receiver receives the alarm signal (5) and thus an emitting element of a warning sign is activated, which emits said signal and will be able to be processed in a warning management system.

As mentioned previously, the insect source of attraction will be the temperature of the inner chamber (2) Ti. For the suitable operation of the device (1) of the present invention, the inner chamber (2) has a temperature Ti from 20-40° C. In a preferred embodiment of the present invention, the inner chamber (2) has a temperature of 35° C.

In another preferred embodiment, the device (1) additionally has complementary means for attracting insects selected from among food, pheromones and ultraviolet light.

With the aim of providing the suitable temperature inside the inner chamber (2), the inner heating base (3) has the electrical resistance (6); said inner heating base (3) is connected to an energy source; additionally, it has a thermostat (not shown) for regulating the temperature in the inner chamber (2).

The operating procedure of the device (1) of the present invention is carried out in the following manner: the insect detecting device (1) has a temperature Ti in the inner chamber (2), determined by the electrical resistance (6) located in the inner heating base (3), and thus it will emit infrared radiation associated with said temperature. Once an insect is attracted by the temperature Ti of the inner chamber (2), or by other complementary means for attracting insects that have been used, the insect will enter into said inner chamber (2). Upon entering into the inner chamber (2), the insect has a temperature equal to the outside temperature Te, and thus will emit infrared radiation associated with said temperature. The temperature Te is less than the temperature Ti of the inner chamber (2) and, therefore, the passive infrared sensor (4) will detect a difference in infrared radiation in said inner chamber (2), and it will emit an alarm signal responding to the presence of the insect.

According to the characteristics of the insects, they do not regulate temperature, for which reason they will have a temperature equal to the outside temperature Te, and holding as a condition that Ti>Te, the passive infrared sensor will emit an alarm signal when it detects the change in infrared radiation caused by the entrance of the insect.

The device of the present invention will be able to be incorporated in a system for detecting insects; wherein the system for detecting insects will be able to be made up of at least:
  a device (1) for detecting insects according to the present invention, wherein the device (1) comprises an inner chamber (2) provided with an opening (8) for the entrance of insects, an inner heating base (3) that has an electrical resistance for supplying heat and maintaining a temperature Ti in said inner chamber (2), and a passive infrared sensor (4) enabled to detect infrared radiation and that emits an alarm signal (5) when it detects a change in infrared radiation in the inner chamber (2),
  an alarm receiving element that detects the alarm signal (5) emitted by the passive infrared sensor (4), and
  a warning signal emitting element.

The warning signal will be able to be of any kind, for example, the warning signal is selected from among a sound, light and digital signal. In the case of using a digital warning signal, it will be linked, by the suitable means, to a data processing module that will enable the monitoring of the insect activity in a specific area, for the subsequent application of the most effective control means according to the case.

The details, shapes, dimensions and other accessory elements, as well as the materials used to manufacture the device for detecting insects of the present invention, may be suitably substituted for others which are technically equivalent, and do not diverge from the essential nature of the invention, nor the scope defined by the claims included below.

The invention claimed is:

1. A device for detecting insects comprising:
   an inner chamber provided with an opening for the entrance of insects;
   an inner heating base comprising:
      an electrical resistance for supplying heat; and
      a thermostat for controlling the electrical resistance in order to regulate and maintain an inner temperature $T_i$ in the inner chamber; and
   a passive infrared sensor enabled to detect infrared radiation and that emits an alarm signal when the passive infrared sensor detects a change in infrared radiation in the inner chamber.

2. The device for detecting insects according to claim 1, wherein the inner chamber has a temperature $T_i$ from 20° C.-40° C.

3. The device for detecting insects according to claim 2, wherein the inner chamber has a temperature of 35° C.

4. The device for detecting insects according to claim 1, further comprising complementary means for attracting insects selected from among food, pheromones and ultraviolet light.

5. The device for detecting insects according to claim 1 wherein the inner heating base is connected to an energy source.

6. The device for detecting insects according to claim 1, wherein the electrical resistance is located in the inner heating base.

* * * * *